United States Patent
Kim et al.

(10) Patent No.: US 11,629,204 B2
(45) Date of Patent: Apr. 18, 2023

(54) METHOD FOR PREPARING CHLORINATED POLYVINYL CHLORIDE RESIN

(71) Applicant: Hanwha Solutions Corporation, Seoul (KR)

(72) Inventors: Yang Jung Kim, Daejeon (KR); Ki Won Hong, Incheon (KR); Woo Young Lee, Seoul (KR); Seon Jeong Jin, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 388 days.

(21) Appl. No.: 16/651,561

(22) PCT Filed: Oct. 24, 2018

(86) PCT No.: PCT/KR2018/012661
§ 371 (c)(1),
(2) Date: Mar. 27, 2020

(87) PCT Pub. No.: WO2019/083280
PCT Pub. Date: May 2, 2019

(65) Prior Publication Data
US 2021/0380731 A1    Dec. 9, 2021

(30) Foreign Application Priority Data
Oct. 25, 2017  (KR) .................. 10-2017-0139440

(51) Int. Cl.
C08F 14/06    (2006.01)
C08F 8/20    (2006.01)
C08F 8/22    (2006.01)

(52) U.S. Cl.
CPC .............. C08F 14/06 (2013.01); C08F 8/20 (2013.01); C08F 8/22 (2013.01)

(58) Field of Classification Search
CPC ...... C08F 6/02; C08F 8/18; C08F 8/20; C08F 8/22; C08F 14/16; C08J 2327/06
See application file for complete search history.

(56) References Cited

U.S. PATENT DOCUMENTS

| | | | |
|---|---|---|---|
| 3,334,078 A * | 8/1967 | Gateff | ........................ C08F 8/20 525/342 |
| 4,039,732 A | 8/1977 | Schoen et al. | |
| 4,345,040 A | 8/1982 | Hall | |
| 4,874,823 A | 10/1989 | Cinadr | |
| 5,359,011 A | 10/1994 | Vielhaber et al. | |
| 5,821,304 A | 10/1998 | Backman et al. | |
| 6,590,041 B1 | 7/2003 | Eguchi et al. | |
| 2016/0159945 A1 | 6/2016 | Munshi et al. | |

FOREIGN PATENT DOCUMENTS

| | | |
|---|---|---|
| CN | 105017449 | 11/2015 |
| EP | 0053615 | 1/1985 |
| JP | 1994-000882 | 7/1991 |
| JP | 11-158221 | 6/1999 |
| JP | 2000-239320 | 9/2000 |
| JP | 2003-277436 | 10/2003 |
| JP | 2004-307717 | 11/2004 |
| JP | 2006-322013 | 11/2006 |
| JP | 2016-525607 | 8/2016 |
| KR | 10-0452391 | 12/1997 |
| KR | 10-2012-0087480 | 8/2012 |
| KR | 10-1654147 | 9/2016 |
| KR | 10-1860149 | 5/2018 |
| TW | I227243 | 2/2005 |

OTHER PUBLICATIONS

JP H11158221 machine translation (Year: 2022).*
KR 101654147 machine translation (Year: 2022).*
KIPO, PCT Search Report & Written Opinion of PCT/KR2018/012661 dated Apr. 26, 2019.
SIPO, Office Action of CN 201880068839.5 dated Jun. 22, 2022.

* cited by examiner

*Primary Examiner* — Irina S Zemel
*Assistant Examiner* — Jeffrey S Lenihan
(74) *Attorney, Agent, or Firm* — Lex IP Meister, PLLC

(57) ABSTRACT

Provided is a method for preparing a chlorinated polyvinyl chloride resin, and more particularly, a method for preparing a chlorinated polyvinyl chloride resin including a neutralization process for neutralizing to pH of 2 to 5 using metal hydroxide as a first neutralizing agent a), and completing neutralization using a carbonate-based compound as a second neutralizing agent b), wherein residual hydrochloric acid in pores of the chlorinated polyvinyl chloride resin obtained by chlorination of a polyvinyl chloride or a vinyl chloride-based copolymer may be efficiently removed, and thermal stability and extrusion appearance of processed articles may be improved.

8 Claims, No Drawings

METHOD FOR PREPARING CHLORINATED POLYVINYL CHLORIDE RESIN

CROSS-REFERENCE TO RELATED APPLICATION(S)

The present application is based on, and claims priority from, Korean Patent Application No. 10-2017-0139440, filed on Oct. 25, 2017, the disclosure of which is hereby incorporated by reference herein in its entirety.

TECHNICAL FIELD

The present invention relates to a method for preparing a chlorinated polyvinyl chloride resin, and more particularly, a method for preparing a chlorinated polyvinyl chloride resin, in which residual hydrochloric acid in pores of the chlorinated polyvinyl chloride resin obtained by chlorination of a polyvinyl chloride or a vinyl chloride-based copolymer may be efficiently removed, additional generation of carbon dioxide during a neutralization process may be prevented, excellent thermal stability may be obtained, and appearance properties of processed articles may be improved during processing.

BACKGROUND ART

Chlorinated polyvinyl chloride (CPVC) is produced by chlorination of polyvinyl chloride (PVC). CPVC has excellent mechanical properties, heat resistance, and chemical resistance due to a high chlorine content, as compared with existing PVC, and is used in various applications such as cold and hot water pipes, industrial pipes, sprinkler pipes, adhesives, etc.

During a reaction of PVC and chlorine to obtain this CPVC, HCl is additionally produced. When the produced HCl remains inside the CPVC resin, HCl causes corrosion of subsequent equipment, and it also acts as a catalyst to promote decomposition of CPVC, thereby lowering the processing stability. Therefore, to produce CPVC with improved stability, it is necessary to efficiently remove HCl. For this reason, a neutralization process is generally employed.

However, in the neutralization process, since strong acidic hydrochloric acid is neutralized, use of a strong basic material makes it difficult to control pH and generates high heat of neutralization. Moreover, the strong basic material may also directly attack CPVC chains, leading to deterioration of physical properties.

Therefore, neutralization is carried out using alkaline buffers, and neutralizing agents, such as $NaHCO_3$ (sodium bicarbonate), $Na_2CO_3$ (sodium carbonate), sodium citrate, etc., are generally used.

For example, Korean Patent Publication No. 2012-0087480 discloses use of sodium bicarbonate in a neutralization process for preparing a chlorinated polyvinyl chloride resin. Further, U.S. Pat. No. 5,359,011 discloses use of soluble citrate in a neutralization process for preparing a chlorinated polyvinyl chloride resin.

However, the above-described conventional basic materials are not effective in removing residual HCl due to $CO_2$ and hypochlorite which are additionally generated during the neutralization process, and lower the resin color difference and the process color difference of CPVC. In addition, the generated $CO_2$ causes generation of protrusions on the processed extrusion surface, resulting in uneven appearance of the processed article.

DETAILED DESCRIPTION OF THE PRESENT DISCLOSURE

Technical Problem

An object of the present invention is to provide a method for preparing a chlorinated polyvinyl chloride resin (CPVC), in which hydrochloric acid generated during preparation of CPVC by chlorination of PVC is neutralized by a two-stage neutralization process using neutralizing agents optimized for each stage, thereby efficiently removing residual hydrochloric acid in pores of the CPVC resin, preventing additional generation of carbon dioxide during the neutralization process, obtaining excellent thermal stability, and improving appearance properties of processed articles during processing.

Technical Solution

The present invention provides a method for preparing a chlorinated polyvinyl chloride resin, the method including:

a preparation process of a chlorinated polyvinyl chloride resin by performing chlorination of a polyvinyl chloride (PVC) or a vinyl chloride-based copolymer (hereinafter, referred to as 'PVC-containing copolymer'); and a neutralization process of the chlorinated polyvinyl chloride resin by adding neutralizing agents to the chlorinated polyvinyl chloride resin;

wherein the neutralization process includes a first neutralization process for neutralizing the chlorinated polyvinyl chloride resin to pH of 2 to 5 using metal hydroxide as a first neutralizing agent a), and a second neutralization process for completing neutralization of the chlorinated polyvinyl chloride resin which is neutralized to pH of 2 to 5, using a carbonate-based compound as a second neutralizing agent b).

The metal hydroxide a) may be one or more selected from the group consisting of sodium hydroxide, potassium hydroxide, and lithium hydroxide.

Further, in the present invention, the carbonate-based compound b) may be one or more selected from the group consisting of sodium carbonate, sodium bicarbonate, potassium carbonate, potassium bicarbonate, and calcium carbonate.

In the neutralization process, the addition of the metal hydroxide a) may increase pH of the chlorinated polyvinyl chloride resin to 2 to 5, and subsequently, the carbonate-based compound b) may be used to adjust pH of the chlorinated polyvinyl chloride resin to 6 to 8, thereby completing neutralization.

Further, in the neutralization process, the chlorinated polyvinyl chloride resin prior to the addition of the neutralizing agents may include i) a slurry after the chlorination, ii) a dehydrated slurry from which impurity is removed after the chlorination, or iii) a suspension prepared by mixing the dehydrated slurry with a solvent.

Specifically, the chlorinated polyvinyl chloride resin may include a suspension which is prepared by mixing a solvent with the dehydrated slurry from which impurity is removed after the chlorination.

The neutralization process may be carried out under a temperature condition of 25° C. to 80° C.

Further, the method may further include a process for processing the chlorinated polyvinyl chloride resin after the neutralization process.

The CPVC resin prepared according to the preparation method of the present invention may have excellent thermal stability, and a processed article produced by using the same may exhibit a remarkable reduction of protrusions on the extrusion surface thereof.

Advantageous Effects

According to a method for preparing a chlorinated polyvinyl chloride (CPVC) of the present invention, residual hydrochloric acid in pores of the CPVC resin obtained by chlorination of a polyvinyl chloride or a vinyl chloride-based copolymer may be efficiently removed, and additional generation of carbon dioxide during a neutralization process may be prevented.

Further, the CPVC prepared according to the method may exhibit excellent thermal stability, and may greatly improve properties of extrusion appearance of processed articles during processing.

DETAILED DESCRIPTION OF THE EMBODIMENTS

Hereinafter, the present invention will be described in more detail. Further, the present invention may be variously modified and have various forms, and specific examples will be exemplified and explained in detail below. However, it is not intended to limit the present invention to the specific embodiments and it must be understood that the present invention includes every modifications, equivalents, or replacements included in the spirit and technical scope of the present invention.

It will be further understood that the term "including", when used in this specification, specifies stated features, regions, integers, steps, operations, elements, and/or components, but do not preclude the presence or addition of other features, regions, integers, steps, operations, elements, and/or components.

Hereinafter, a method for preparing a chlorinated polyvinyl chloride resin of the present invention will be described in more detail.

The method for preparing a chlorinated polyvinyl chloride (CPVC) resin according to one embodiment of the present invention may include a chlorination process of a polyvinyl chloride (PVC) or a PVC-containing copolymer to form CPVC (a process for preparing CPVC); and a neutralization process of the CPVC by adding neutralizing agents to the CPVC (a process for neutralizing CPVC), wherein the neutralization process includes a first neutralization process for neutralizing the CPVC to pH of 2 to 5 using metal hydroxide as a first neutralizing agent a), and a second neutralization process for completing neutralization of the resulting product of the first neutralization process using a carbonate-based compound as a second neutralizing agent b).

When hydrochloric acid (HCl) generated in the conventional preparation process of the chlorinated polyvinyl chloride resin (CPVC) by chlorination is neutralized, use of neutralizing agents commonly employed generates a problem of not effectively removing the hydrochloric acid or generating by-products.

For this reason, in the present invention, the neutralization process is performed in multiple stages as above, and CPVC is neutralized using neutralizing agents optimized for each stage, thereby effectively and completely removing hydrochloric acid which may remain in pores of CPVC, as well as preventing additional generation of carbon dioxide during the neutralization process. Further, CPVC neutralized by the method may exhibit excellent basic properties required for chlorinated polyvinyl chloride resins, in particular, excellent thermal stability while improving extrusion appearance properties of the processed surface during processing.

Each process of the method according to the present invention will be described.

Process for Preparing CPVC

The process for synthesizing CPVC may be carried out according to a method generally known, and may be, but is not particularly limited in view of constitution, preferably carried out by the following method.

For example, a PVC or a PVC-containing copolymer is put into a reactor, and then oxygen is removed under vacuum. After introduction of chlorine gas, chlorination may be carried out through a photoreaction by UV irradiation while raising the temperature at the same time.

The PVC or PVC-containing copolymer used in the chlorination may be used in a solvent-containing slurry state. In this regard, the solvent is not particularly limited. For example, water, such as deionized water, etc., may be used. Further, the slurry may include a solvent used in polymerization of the PVC or PVC-containing copolymer, specifically, water. For example, when the solvent is water, a content of the PVC or PVC-containing copolymer in the slurry may be 10 parts by weight to 35 parts by weight with respect to 100 parts by weight of water.

Further, the PVC or PVC-containing copolymer may be prepared by using a vinyl chloride monomer alone or by copolymerizing the vinyl chloride monomer with various monomers according to a method well known in the art. Accordingly, in the present invention, the PVC-containing copolymer refers to a vinyl chloride-based copolymer prepared by copolymerizing the vinyl chloride monomer with another monomer. Further, the copolymerization method may employ suspension polymerization, emulsion polymerization, or mass polymerization.

The PVC or PVC-containing copolymer may be solid porous macrogranules. In other words, the PVC or PVC-containing copolymer may be secondary particles of macrogranules which are formed by agglomeration of primary particles of 50 μm to 250 μm. Further, such a PVC or PVC-containing copolymer may have a mercury porosity of 0.1 to 0.4 (cubic centimeters per gram, $cm^3/g$).

Further, oxygen is removed by a common method, prior to chlorination of the PVC or PVC-containing copolymer.

Subsequently, chlorine gas is introduced to the PVC or PVC-containing copolymer, from which oxygen is removed, and chlorination is allowed by UV irradiation while raising the temperature at the same time. At this time, UV irradiation conditions may be appropriately controlled according to the size of the reactor, and the chlorination may be carried out by a method well known in the art.

During the chlorine introduction, it is preferable that a pressure of chlorine is maintained between 0.5 bar to 4 bar, and a reaction temperature is 50° C. to 95° C.

During the chlorination, chlorine may be also allowed to form radicals by adding an initiator, instead of UV irradiation. In this case, any substance may be used as the initiator, as long as it is well known as a photoinitiator, and for example, one or more selected from the group consisting of peroxyester, hydroperoxide, and dialkyl peroxide may be used.

During the chlorination, when chlorine reaches a target amount, the reaction is terminated, and then the subsequent neutralization process is carried out.

Process for Neutralizing CPVC To increase stability of CPVC, it is necessary to minimize the amount of residual HCl in CPVC by increasing pH. Therefore, in the present invention, when the chlorination is terminated, a neutralization process of CPVC is carried out by adding a particular neutralizing agent to the CPVC slurry in each stage of a two-stage neutralization process, in order to remove hydrochloric acid generated by chlorination. Through this neutralization process, in the present invention, the amount of hydrochloric acid present in CPVC, particularly, in pores may be minimized, and additional generation of a by-product of neutralization, such as $CO_2$, etc., may be minimized, thereby improving appearance of a processed article.

Specifically, in the method for preparing the chlorinated polyvinyl chloride resin according to one embodiment of the present invention, the neutralization process includes a first neutralization process for neutralizing the CPVC to pH of 2 to 5 using metal hydroxide as a first neutralizing agent a), and a second neutralization process for completing neutralization of the resulting product of the first neutralization process, i.e., the CPVC neutralized to pH of 2 to 5, using a carbonate-based compound as a second neutralizing agent b).

Since the first neutralizing agent of metal hydroxide used in the first neutralization process neutralizes hydrochloric acid in CPVC without $CO_2$ generation, overall $CO_2$ generation may be minimized, thereby solving a problem of generating protrusions on the extrusion surface of a processed article by $CO_2$, resulting in improving the extrusion appearance properties of the processed article. However, since the metal hydroxide is a strong base, it is not easy to adjust pH, and there is a concern about generating heat of neutralization. Therefore, the problem may be solved by optimizing the amount of the first neutralizing agent and by using a weak basic carbonate-based compound as the second neutralizing agent in the second neutralization process, thereby improving thermal stability.

If the carbonate-based compound which is the second neutralizing agent is first used in the first neutralization process, it is difficult to obtain the effect of preventing $CO_2$ generation, and it is also difficult to remove residual HCl due to $CO_2$ and hypochlorite which are generated during the neutralization process. In addition, if the metal hydroxide which is the first neutralizing agent is used in the second neutralization process, it is not easy to control pH because the metal hydroxide is a strong base, and high heat of neutralization is generated to attack CPVC chains, leading to deterioration of physical properties.

In the present invention, the first neutralizing agent and the second neutralizing agent are classified into a strong base and a weak base, respectively, depending on the difference in basicity (degree of ionization) of the neutralizing agent. Since pH represents a logarithmic scale of the proton concentration, an acid/base neutralization reaction shows a rapid pH change near the equivalence point according to the addition of a neutralizing agent. In neutralization of a strong acid and a strong base, the equivalence point is at pH of 7. In neutralization of a strong acid and a weak base, the equivalence point is at pH of lower than 7. Usually, after neutralization of CPVC, the minimal point of residual HCl and residual neutralizing agent is at pH 7. To approach to the final neutralization pH near the equivalence point, it is more preferable to use the second neutralizing agent which is a weak base, rather than the first neutralizing agent which is a strong base, in the second neutralization process. Further, when the strong base is used, pH rapidly increases, and thus the hydroxide group is likely to attack the main chain of CPVC. For this reason, use of the first neutralizing agent in the second neutralization process is not preferred.

In the preparation method according to one embodiment of the present invention, therefore, the first neutralizing agent of the strong base is used in the range of easily controlling pH during CPVC neutralization, thereby neutralizing CPVC as much as possible until the pH of CPVC reaches 2 to 5. Thereafter, neutralization is completed by using the second neutralizing agent of the weak base for thermal stability and for easy approach to the final neutralization pH.

In the first neutralization process, metal hydroxide may be used as the first neutralizing agent a), and the metal hydroxide may be specifically exemplified by sodium hydroxide, potassium hydroxide, lithium hydroxide, etc. These may be used alone or in a mixture of two or more thereof.

Further, the metal hydroxide may be added in such an amount that pH of the CPVC satisfies 2 to 5, and specifically, the first neutralizing agent may be added in an amount of 1 part by weight to 3 parts by weight with respect to 100 parts by weight of CPVC.

In the present invention, the first and second neutralizing agents have a trade-off relationship in terms of preventing formation of protrusions on the extrusion surface of a processed article and improving thermal stability. As described above, since the first neutralizing agent does not generate $CO_2$ during the neutralization reaction, it is possible to prevent deterioration of appearance properties due to formation of protrusions on the extrusion surface of a processed article, which is caused by $CO_2$ generated during the conventional neutralization reaction. However, since metal hydroxide used as the first neutralizing agent is a strong base, it is not easy to adjust pH, and there is a concern about generating heat of neutralization. Although the second neutralizing agent is easy to adjust pH and may increase the thermal stability of the resin through the control of heat of neutralization, there is a concern about generating $CO_2$ during the neutralization reaction.

Accordingly, to achieve the effects of improving thermal stability and reducing the protrusions on the extrusion surface through control of $CO_2$ generation at the same time, the amounts of the first and second neutralizing agents should be optimized. In the method for preparing CPVC according to one embodiment of the present invention, during the neutralization, the first neutralizing agent of metal hydroxide may be added in such an amount that pH of CPVC reaches 2 to 5. If the first neutralizing agent is used in an excessive amount, and as a result, pH exceeds 5, thermal stability is greatly reduced, as supported in Experimental Example below (see Comparative Example 1). If the first neutralizing agent is used in a small amount, and as a result, pH is lower than 2, it is necessary to use a large amount of the second neutralizing agent for neutralization of CPVC, and thus the effect of controlling $CO_2$ generation by the first neutralizing agent is insignificant. As a result, the number of protrusions on the extrusion surface of a process article is greatly increased (see Comparative Examples 2 and 3).

Meanwhile, in the second neutralization, a carbonate-based compound may be used as the second neutralizing agent b), and the carbonate-based compound may be specifically exemplified by sodium carbonate, sodium bicarbonate, potassium carbonate, potassium bicarbonate, calcium carbonate, etc., and these may be used alone or in a mixture of two or more thereof.

Further, the carbonate-based compound may be added in such an amount that pH of the CPVC subjected to the first neutralization in first neutralization process becomes 6 to 8. Specifically, the second neutralizing agent may be added in an amount of 1 part by weight to 5 parts by weight with respect to 100 parts by weight of CPVC prior to the neutralization process.

The first and second neutralizing agents may be added in a powder or a solution, respectively, thereby adjusting pH to a desired level. At this time, the temperature during neutralization may be within the range of a boiling point of the solvent. The neutralizing agents are added under stirring to increase the neutralization efficiency. CPVC of which neutralization is completed may be subjected to dehydration and drying processes, thereby obtaining CPVC from which the solvent and impurities are removed.

Meanwhile, in the neutralization process, the chlorinated polyvinyl chloride resin prior to addition of the neutralizing agents may be in a slurry or suspension state.

Specifically, in the neutralization process, the chlorinated polyvinyl chloride resin prior to addition of the neutralizing agents may include i) a slurry after the chlorination, ii) a dehydrated slurry from which impurity is removed, or iii) a suspension prepared by mixing the dehydrated slurry with a solvent. More specifically, the chlorinated polyvinyl chloride resin may be used in a suspension state prepared by mixing the dehydrated slurry with the solvent. The dehydrated slurry may be in a cake form.

In other words, after completing the chlorination, the reaction product may be in the slurry state. In the neutralization process, the neutralizing agents may be added to the CPVC in the slurry state without a separate purification process. Alternatively, the neutralizing agents may be added to the dehydrated CPVC slurry which has undergone a process for dehydrating the CPVC slurry in order to remove impurity. Alternatively, the neutralizing agents may be added to the suspension which is re-slurried by adding a solvent to the dehydrated CPVS slurry. Among the methods, the method for adding the neutralizing agents to the suspension which is reslurried after dehydration is the most efficient in terms of removing impurity and reducing the amounts of the neutralizing agents. The solvent added to the dehydrated CPVC slurry may be distilled water, alcohol, etc. Further, when the slurry or the suspension is used, a solid content may be 20% by weight to 50% by weight.

Meanwhile, since the temperature before and after the neutralization process is 25° C. to 80° C., the neutralization process may be carried out under a temperature condition of 25° C. to 80° C.

Further, the neutralization efficiency may be increased by adding the neutralizing agents under stirring. From the CPVC of which neutralization is completed, the solvent and impurity may be removed through dehydration and drying processes, thereby obtaining CPVC.

Process for Processing CPVC

The method for preparing CPVC according to one embodiment of the present invention may further include a process for processing the CPVC of which neutralization is completed.

When the processing process is carried out, extrusion appearance of a processed article of CPVC may be examined.

According to one preferred embodiment, when the processing process of the CPVC resin is carried out, an additive is mixed in an amount of 10 parts by weight to 30 parts by weight with respect to 100 parts by weight (phr) of CPVC to prepare a CPVC compound composition.

As the additive, any additive may be used, as long as it is used in a common process for processing CPVC. For example, a heat stabilizer (a tin-based heat stabilizer such as mono, dimethyltin mercaptide complex, etc.), an impact modifier (methylmethacrylate-butadiene-styrene copolymer (MBS), etc.), a lubricant (a polyester-based compound such as dipentaerythritol hexastearate, paraffin, or a mixture thereof, etc.), or a filler (titanium dioxide, etc.) may be exemplified, and these may be used alone or in a mixture of two or more thereof.

Thereafter, the CPVC compound composition may be extruded using a T-die extruder to obtain a processed sheet having a thickness of 3 mm.

Accordingly, the method of the present invention may provide a chlorinated polyvinyl chloride resin, in which thermal stability is excellent and the number of protrusions on the extrusion surface of a processed article is small.

Hereinafter, the present invention will be described in more detail with reference to Examples according to the present invention. However, these Examples are for illustrative purposes only, and the scope of the present invention is not intended to be limited thereby.

Comparative Examples 1 to 3 and Examples 1 to 4

Synthesis of CPVC

PVC (degree of polymerization: 1,000) was chlorinated to synthesize CPVC.

In detail, PVC in a slurry state (solid content: 20% by weight) was put into a reactor, together with deionized water, and oxygen in the reactor was removed by vacuum treatment. Chlorine was introduced into the reactor under vacuum, and UV was irradiated while raising the temperature at the same time. During the reaction, a pressure of chlorine was maintained between 0.5 bar to 4.0 bar, and the reaction was conducted at a reaction temperature of 50° C. to 95° C. When chlorine reached a target amount during chlorination, the reaction was terminated.

Neutralization of CPVC

Neutralizing agents of the following Table 1 were added to the CPVC slurry, of which chlorination was completed, and a neutralization process was conducted.

At this time, the neutralization was conducted at a temperature within the boiling point range (50° C.) of the solvent.

Further, the neutralizing agents were added under stirring. From the CPVC of which neutralization was completed, the solvent and impurity were removed through dehydration and drying processes to obtain CPVC.

Processing of CPVC

To examine physical properties of processed CPVC, processing was carried out.

In detail, 100 phr of the CPVC resin was mixed with 2 parts by weight of a tin-based heat stabilizer (mono, dimethyltin mercaptide complex), 8 parts by weight of methylmethacrylate-butadiene-styrene copolymer (MBS) as an impact modifier, 5 parts by weight of a mixture (a mixing weight ratio of paraffin and polyester=1:1) of paraffin and a polyester-based lubricant (Loxiol G2899™, product of Emery) as a lubricant, and 3 parts by weight of titanium dioxide as a filler to prepare a CPVC compound composition.

The prepared compound composition was extruded using a T-die extruder to obtain a processed article having a thickness of 3 mm.

Experimental Example

Physical properties of the CPVCs of Comparative Examples and Examples were evaluated by the following method, and the results are shown in Table 1 below.

Method of Analyzing Physical Properties

HCl stability: the CPVC resin was water-dispersed at a concentration of 10%, and then heated at 180° C. The time until change of 50 μs occurred in conductivity by generated HCl was measured. HCl stability is used as an indicator for thermal stability of CPVC.

Protrusions on processed extrusion surface: the number of protrusions formed by foaming on the surface of the T-die extruded CPVC sheet was measured.

TABLE 1

| | Comparative Example 1 | Comparative Example 2 | Comparative Example 3 | Example 1 | Example 2 | Example 3 | Example 4 |
|---|---|---|---|---|---|---|---|
| Kind of first neutralizing agent | NaOH | — | — | NaOH | NaOH | NaOH | NaOH |
| Input of first neutralizing agent (pH of CPVC) | 7.0 | — | — | 2.5 | 4.0 | 2.5 | 4.0 |
| Kind of second neutralizing agent | — | SC | SB | SC | SC | SB | SB |
| Input of second neutralizing agent (pH of CPVC) | — | 7.0 | 7.0 | 7.0 | 7.0 | 7.0 | 7.0 |
| HCl stability (h) | 0.43 | 0.53 | 0.52 | 0.51 | 0.49 | 0.50 | 0.49 |
| Number of protrusions on extrusion surface of processed article (protrusions/200 cm$^2$) | 27 | 151 | 152 | 32 | 37 | 36 | 42 |

In Table 1, SC is an abbreviation for sodium carbonate, and SB is an abbreviation for sodium bicarbonate.

Referring to Table 1, when Comparative Example 1 and Comparative Examples 2 and 3 were compared with each other, excellent HCl stability (thermal stability) was observed when neutralized with the carbonate-based compound, and the excellent number of protrusions on the extrusion surface of the processed article was observed when neutralized with sodium hydroxide which is a metal hydroxide.

Meanwhile, when only one neutralizing agent, i.e., only the carbonate-based compound was used (Comparative Examples 2 and 3), the extrusion surface of the processed article was very poor because many protrusions were observed, and when the metal hydroxide was used (Comparative Example 1), there was a problem of low thermal stability. In contrast, as in Examples 1 to 4, when the metal hydroxide was used in the early stage of neutralization, and then the carbonate-based compound was used for later neutralization, excellent thermal stability and excellent extrusion appearance of the processed article were observed, indicating that both of the problems may be solved.

The invention claimed is:

1. A method for preparing a chlorinated polyvinyl chloride resin, comprising:
    a preparation process of a chlorinated polyvinyl chloride resin by performing chlorination of a polyvinyl chloride or a vinyl chloride-based copolymer; and
    a neutralization process of the chlorinated polyvinyl chloride resin by adding neutralizing agents to the chlorinated polyvinyl chloride resin;
    wherein the neutralization process comprises a first neutralization process for neutralizing the chlorinated polyvinyl chloride resin to pH of 2 to 5 using metal hydroxide as a first neutralizing agent a), and a second neutralization process for completing neutralization of the chlorinated polyvinyl chloride resin which is neutralized to pH of 2 to 5, using a carbonate-based compound as a second neutralizing agent b).

2. The method for preparing a chlorinated polyvinyl chloride resin of claim 1, wherein the metal hydroxide a) is one or more selected from the group consisting of sodium hydroxide, potassium hydroxide, and lithium hydroxide.

3. The method for preparing a chlorinated polyvinyl chloride resin of claim 1, wherein the carbonate-based compound b) is one or more selected from the group consisting of sodium carbonate, sodium bicarbonate, potassium carbonate, potassium bicarbonate, and calcium carbonate.

4. The method for preparing a chlorinated polyvinyl chloride resin of claim 1, wherein, in the neutralization process, pH at the completion of neutralization after adding the carbonate-based compound b) is 6 to 8.

5. The method for preparing a chlorinated polyvinyl chloride resin of claim 1, wherein, in the neutralization process, the chlorinated polyvinyl chloride resin prior to the addition of the neutralizing agents comprises i) a slurry after the chlorination, ii) a dehydrated slurry from which impurity is removed after the chlorination, or iii) a suspension prepared by mixing the dehydrated slurry with a solvent.

6. The method for preparing a chlorinated polyvinyl chloride resin of claim 1, wherein the chlorinated polyvinyl chloride resin comprises a suspension prepared by mixing a solvent with the dehydrated slurry from which impurity is removed after the chlorination.

7. The method for preparing a chlorinated polyvinyl chloride resin of claim 1, wherein the neutralization process is carried out under a temperature condition of 25° C. to 80° C.

8. The method for preparing a chlorinated polyvinyl chloride resin of claim 1, further comprising a process for processing the chlorinated polyvinyl chloride resin after the neutralization process.

* * * * *